United States Patent [19]

Sellmaier, deceased et al.

[11] 3,823,569
[45] July 16, 1974

[54] CIRCULATION SYSTEM FOR LOW-TEMPERATURE FLUIDS

[75] Inventors: Alfons Sellmaier, deceased, late of Munich, Germany by Anne-Rose Sellmaier, heir-at-law and legal guardian; Andreas Michael Sellmaier, Munich, Germany heir-at-law; Alban Noppel, Munich; Gunter Sippel, Hohenschaftlarn, both of Germany

[73] Assignee: Linde Aktiengesellschaft, Wiesbaden, Germany

[22] Filed: Nov. 13, 1972

[21] Appl. No.: 306,356

[30] Foreign Application Priority Data
Dec. 27, 1971 Germany............................ 2164823

[52] U.S. Cl............................ 62/55, 310/54, 310/61
[51] Int. Cl. ....................................... F17c 7/02
[58] Field of Search................ 62/52, 55; 310/54, 61

[56] References Cited
UNITED STATES PATENTS
3,626,717   12/1971   Lorch ..................................... 62/55

*Primary Examiner*—Meyer Perlin
*Assistant Examiner*—Ronald C. Capossela
*Attorney, Agent, or Firm*—Karl F. Ross; Herbert Dubno

[57] ABSTRACT

A low-temperature fluid, delivered by a stationary cooling plant to a rotating load, passes to and from the load by way of two coaxial ducts which are thermally shielded from each other and from the outside by vacuum spaces, these ducts and spaces being formed by four jointly rotating coaxially nested tubes. The return duct lies between the inner and the outer tube pair, the latter pair terminating at an outlet between two ball bearings respectively supporting the outer and the inner tube pair; the bearings are located in stationary journal boxes containing annular seals which elastically engage the outer tube of the respective pair, these seals being located in chambers maintained at near-ambient temperature by heat transfer through the metallic wall of the box. Between these journal boxes the tubes are surrounded by an outer jacket forming another vacuum space around them; the seal chamber of each box communicates with one of the fluid-circulating ducts through a narrow annular clearance formed between the outermost rotating tube and an enveloping fixed tube, this clearance being sandwiched between vacuum spaces and long enough to develop a low temperature gradient therealong. The pairs of rotating tubes are interconnected at one end by corrugated expansion joints allowing relative dimensional changes due to temperature variations.

10 Claims, 3 Drawing Figures

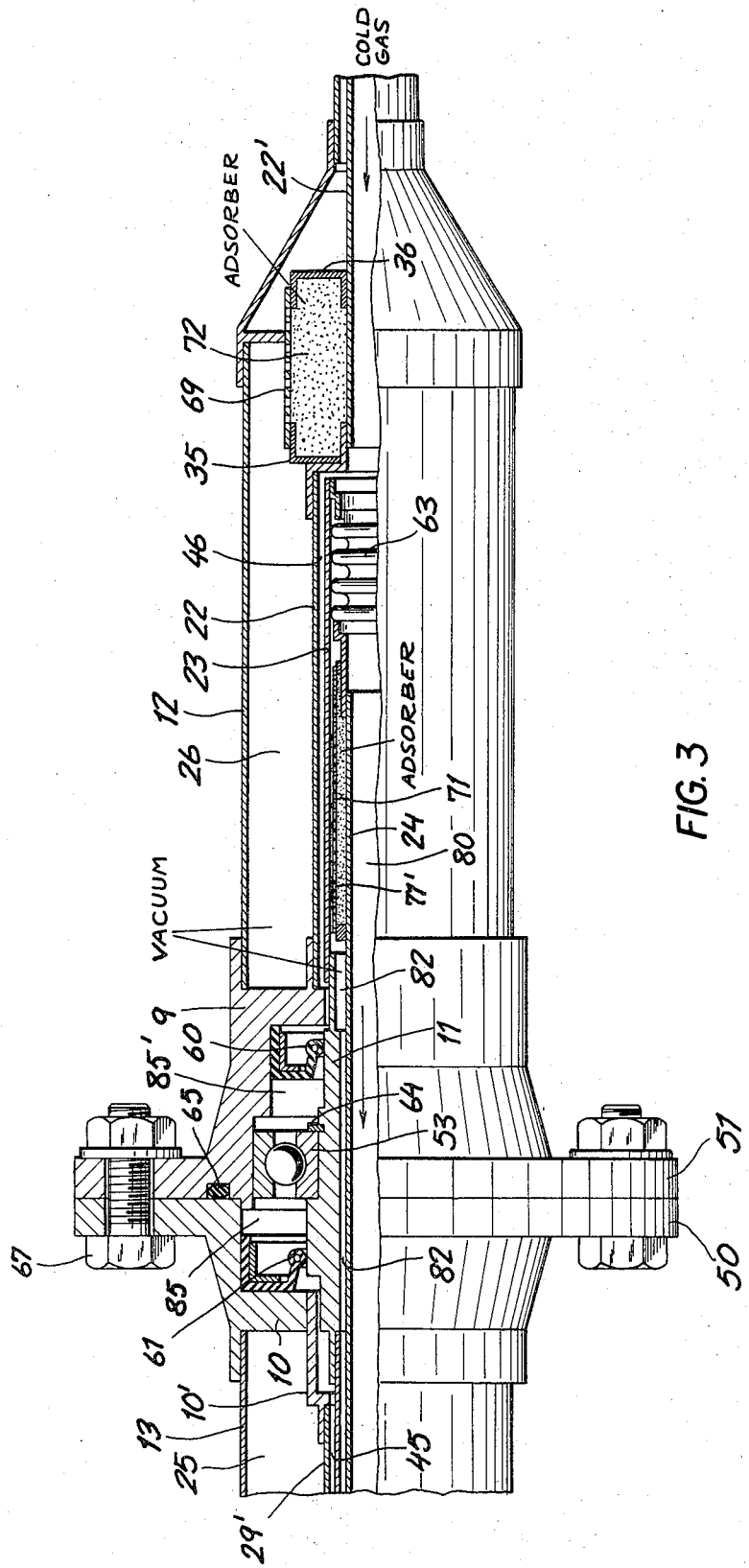

CIRCULATION SYSTEM FOR LOW-TEMPERATURE FLUIDS

FIELD OF THE INVENTION

The present invention relates to a system for supplying a low-temperature fluid, in gaseous or liquid form, to a rotating load and, if necessary, discharging the spent fluid from that load, e.g. with recirculation to the source for the purpose of recooling.

BACKGROUND OF THE INVENTION

The transmission of cold fluids between a stationary source and a rotating load, e.g. a superconductive rotor of an electric machine, involves the problem of both thermally and fluidically shielding the circulation system from the surrounding atmosphere. Annular seals in a bearing chamber, peripherally engaging a rotating tube, form effective barriers between different environments in adjoining spaces, e.g. for the purpose of maintaining a vacuum in a jacket surrounding the rotating tubes; such seals of elastomeric material, however, are subject to rapid deterioration upon prolonged exposure to low temperatures.

OBJECT OF THE INVENTION

It is, therefore, the general object of the present invention to provide a system of the character set forth which operates reliably over long periods even with fluids of very low temperatures.

A more particular object is to provide means in such a system for maintaining the seal or seals at the necessary joints (especially in the bearing chambers) at near-ambient temperatures to prevent their embrittlement and consequent deterioration.

SUMMARY OF THE INVENTION

These objects are realized, pursuant to the present invention, by the provision of a rotating conduit assembly including a plurality of nested tubes joined to the load, a first tube of this assembly forming a feed duct or channel for the low-temperature fluid whereas a second tube surrounds the first tube to define therewith an inner thermally insulating space. A stationary jacket forms an outer thermally insulating space around the second tube and adjoins a bearing chamber in which the latter tube is rotatably journaled, this chamber having a thermally conductive wall which closes it against the atmosphere but maintains its interior at near-ambient temperature. An antifriction (e.g. ball) bearing in the chamber is juxtaposed with an elastomeric annular seal contacting the second tube and separating the bearing from an outlet which leads from the chamber to a restricted passage communicating with the feed channel, this passage being constituted by stationary tubing surrounding the rotating tube with formation of a small clearance whose width may be on the order of one-hundredth the diameter of the feed channel while its length substantially exceeds that diameter. This clearance forms with the chamber a blind pocket in which the low-temperature fluid virtually stagnates while assuming near-ambient temperature in the vicinity of the seal, with development of a static temperature gradient over the length of the clearance. The high flow resistance of the clearance minimizes any pressure differential that would otherwise exist across the seal and also prevents any significant heat transfer from the chamber to the cold end of the clearance by convection.

If a return channel for the spent fluid is required, the assembly may include a third and a fourth tube coaxially surrounding part of the first two tubes and rotating therewith. The return or discharge channel is then formed between the second and third tubes and is bracketed by two thermally insulating spaces, i.e., the one formed between the first and second tubes, and another one formed between the third and fourth tubes. The fourth (outermost) tube is journaled in a second antifriction bearing separated within a second chamber by a second elastomeric seal from an outlet which leads to another point of low temperature, specifically the return duct or channel, by way of a narrow clearance similar to the one described above.

Usually, the thermally insulating space referred to will be evacuated; in such a case the stationary tubing forming the above-described clearance or clearances with the second and possibly the fourth tube may support an adsorber or getter helping maintain a hard vacuum in the surrounding jacket space.

The two inner (first and second) and the two outer (third and fourth) tubes, defining the two thermally insulating spaces within the rotating tube assembly, may be fixedly interconnected at their ends proximal to the load and yieldably interconnected by respective expansion joints at their remote ends to relieve stresses due to thermally induced dimensional changes.

BRIEF DESCRIPTION OF THE DRAWING

The above and other features and advantages of the present invention will become apparent from the following detailed description given with reference to the accompanying drawing in which FIGS. 1, 2 and 3 are axial sectional views of three longitudinally adjoining sections of a conduit system embodying the invention.

SPECIFIC DESCRIPTION

Figure 1:
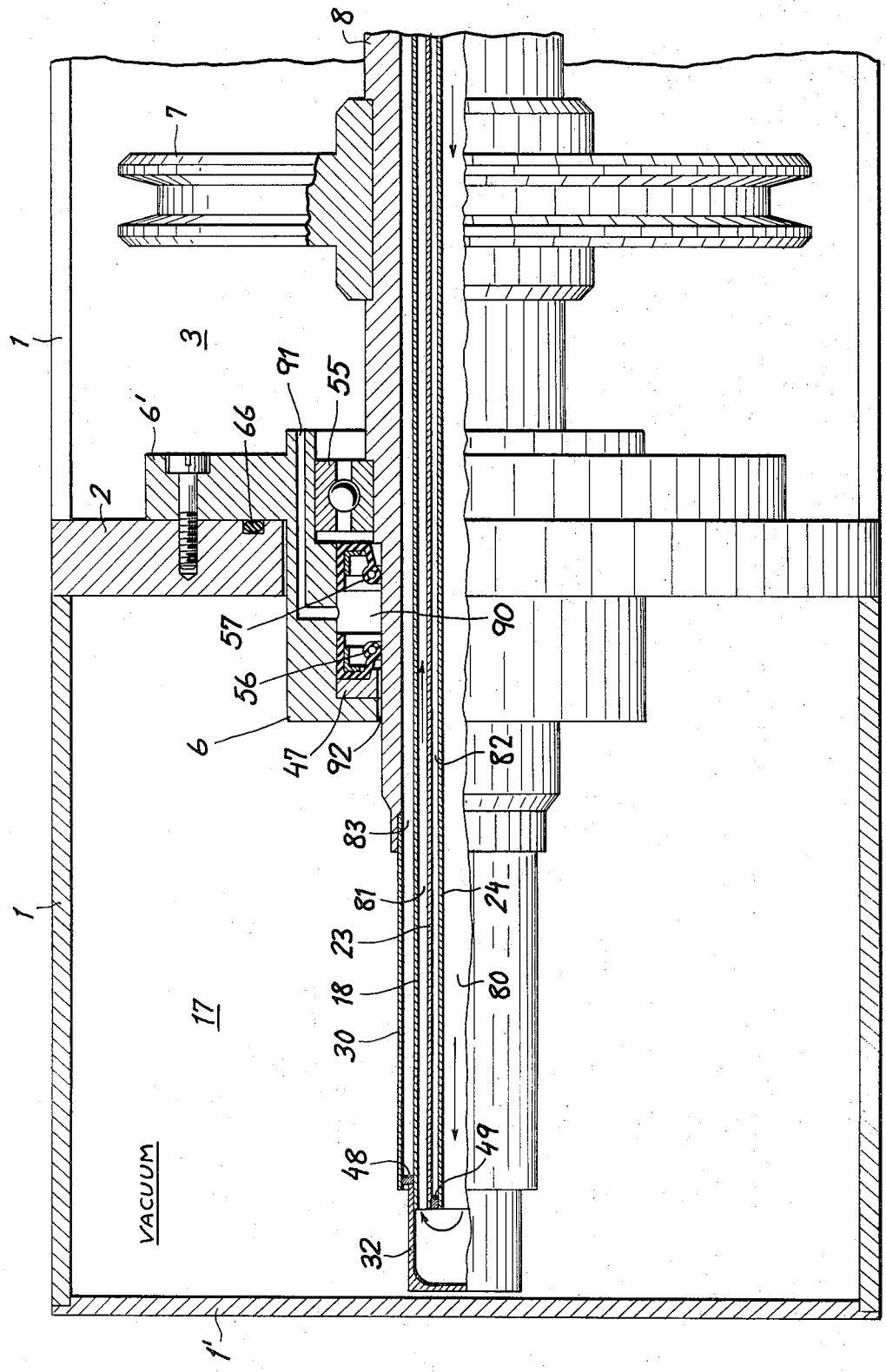

As shown in FIG. 1, a housing with walls 1 and 1' contains a load including a rotatably mounted cooling head 32. A partition 2 divides the interior of the housing into two compartments, 3 and 17, the latter one being evacuated while the former is under atmospheric pressure. Four coaxially nested tubes 18, 23, 24 and 30 pass through the partition 2. The fourth or outermost tube 30 is rotatably journaled in the partition 2 by means of a ball bearing 55. The first or innermost tube 24 forms a feed duct or channel 80 for a low-temperature fluid which at this stage, upstream of the load 32, may be in a liquid state. The intermediate second and third tubes 23 and 18 define a discharge duct or channel 81 for the low-temperature fluid which at this point, downstream of the load, may be assumed to be gaseous.

The four nested tubes 18, 23, 24, 30 are rigidly connected to the head 32 and rotate with it. The ends of the tubes 23 and 24 proximal to the load, located in compartment 17, are rigidly interconnected by a soldered ring 49; the adjoining ends of the tubes 18 and 30, also located in the compartment 17, are likewise rigidly linked to each other by a soldered ring 48. The low-temperature fluid delivered through the feed channel 80 flows through the cooling head 32 and is returned through the discharge channel 81.

The ball bearing 55 is press-fitted into a journal box 6 having a flange 6' fastened (e.g. by screws) to the partition 2, a gasket 66 being received in an annular groove of partition 2. In the area of the journal box 6 the outer tube 30 has a wall reinforcement 8 which extends into the compartment 3. Between the bearing 55 and the evacuated compartment 17 there are within box 6 two annular lip seals 56 and 57 which bear upon a polished part of the wall reinforcement 8, thus isolating the compartments 3 and 17 from each other; seal 56 is mounted on a liner 47. An annular space 83 located between the outer tube 30 and the adjacent tube 18, as well as an annular space 82, located between the inner tube 24 and the adjacent tube 23, are evacuated. A chamber 90 bounded by the seals 56 and 57 communicates with the atmosphere in compartment 3 via a passage 91 whereas the left-hand side of seal 56, proximal to the load, is exposed to the vacuum in compartment 17 by way of a narrow clearance 92 with development of a temperature gradient along that clearance; since the temperature of compartment 17 is not as low as that of head 32, the seals 55, 56 are not subjected to excessive cooling. Tubes 18, 23, 24 and 30 are driven together with head 32 by a nonillustrated motor via a V-belt pulley 7 keyed to the outer tube 30 in compartment 3.

Figure 2:
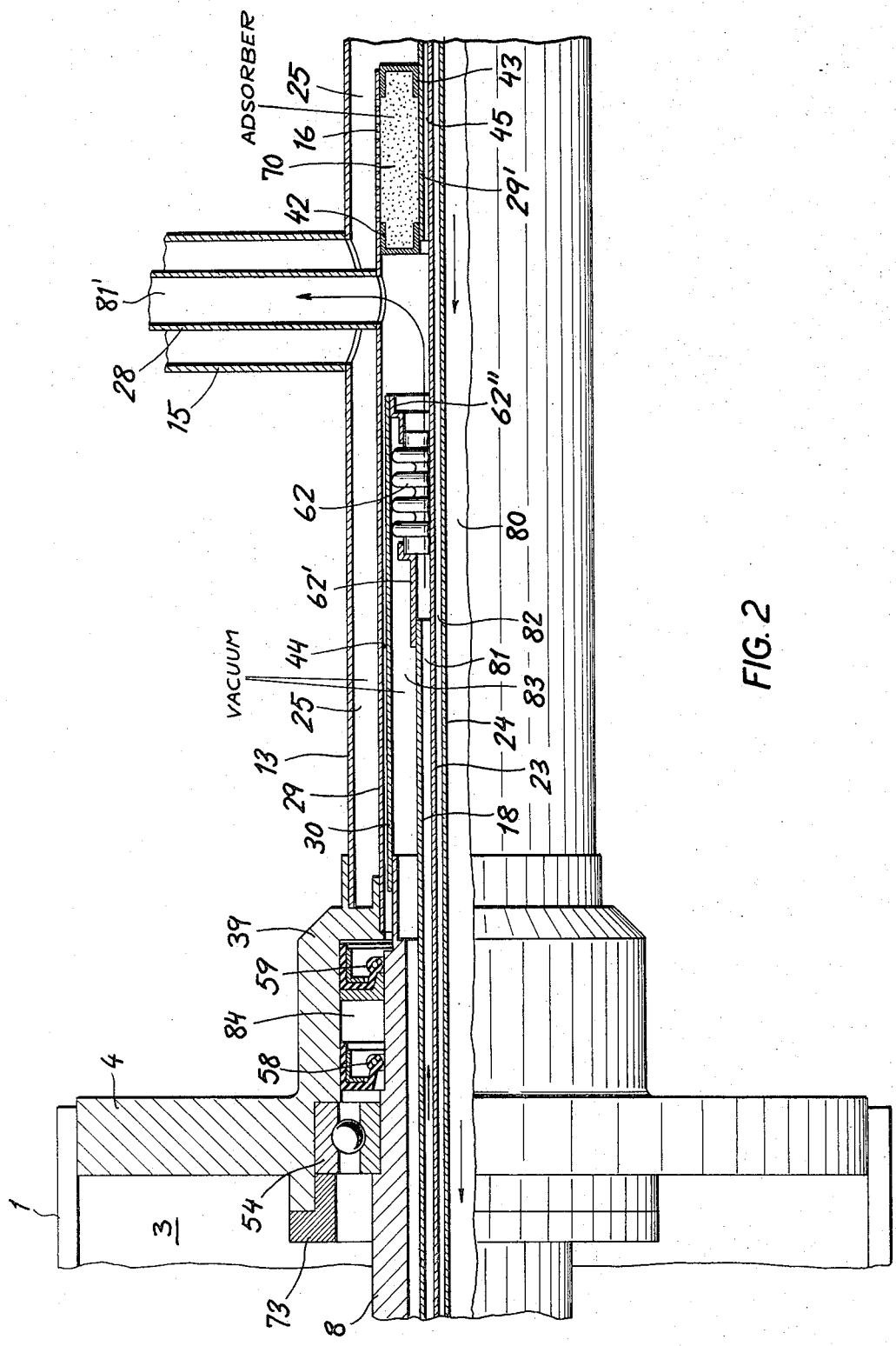

As shown in FIG. 2, an end wall 4 bounding the open compartment 3 is traversed by the four coaxial tubes 18, 23, 24 and 30 which are supported in a fluidtight journal box similar to the one described above. The reinforced tube wall 8, which spans the entire compartment 3, is journaled in a ball bearing 54 inserted in a shell 39 rigid with wall 4 and pressed by means of a clamping ring 73 against an internal shoulder of the shell. The latter defines a chamber 84 accommodating two further annular seals 58 and 59 which, like the seals 56 and 57, may consist of a synthetic elastomer based for example on nitrile rubber. The axially staggered seals 58 and 59 also bear with their lips upon the polished surface of the reinforced tube wall 8. Chamber 84, like the corresponding space 90 of journal box 6, is thermally insulated from the low-temperature ducts 80, 81 by the evacuated spaces 82, 83 so that the seals 58 and 59 are not chilled by the low-temperature working fluid.

At their ends remote from the load 32, the outer tube 30 and the adjacent intermediate tube 18 are linked to each other by means of an expansion joint including a corrugated sleeve 62 of sheet metal such as stainless steel so that the evacuated annular space 83 is closed fluidtight. The extremities of sleeve 62, whose corrugations slidably bear upon the inner wall surface of tube 30, are fixedly connected via stepped rings 62', 62'' with the ends of tubes 18 and 30 so that these tubes have a certain relative longitudinal mobility preventing the buildup of thermal stresses at the joint. The discharge duct 81 terminates just beyond that joint in a lateral outlet 81' formed by a transverse branch 28 of a stationary tube 29 surrounding the rotating tube 30 with small clearance. An outer jacket 13, provided with a transverse branch 15, defines a vacuum space 25 with tubes 28, 29 and is fixedly secured to shell 39 and to a similar but split journal box consisting of two shells 9, 10 (FIG. 3), in which the inner tubes 23, 24 are supported beyond outlet 15, 81'.

The narrow clearance 44 separating tubes 29 and 30, communicating with the discharge duct 81, has a width on the order of 1/100 of that of the feed duct 80. (In a specific example the diameter of the feed duct 80 was about 10 mm and the width of the clearance 44 was about 0.2 mm.) Along the clearance 44, flanked by vacuum in spaces 25 and 83, a temperature gradient develops between its cold end (right) and its warm end (left) since the low-temperature gas from duct 81 has only limited mobility therein and cannot flow back in large quantities toward the chamber 84. This prevents any embrittlement of the material of which the seals 58, 59 are composed.

The inner tube 24 and the adjacent tube 23 extend axially beyond the corrugated sleeve 62 and tubes 18, 30 as seen from the load 32. An extension 29' of stationary tube 29 is separated from tube 23, by a further narrow annular clearance 45 communicating with duct 81. Tube 29 and its extension 29' are interconnected by an annular housing comprising two confronting annular members 42 and 43 bracketing an adsorber or getter 70 which is in contact with jacket space 25 through a grid 16 to maintain a hard vacuum in that space.

As shown in FIG. 3, clearance 45 terminates within an extension 10' of shell 10 at the entrance of a chamber 85 which is occupied by an annular lip seal 61 of the same type as seals 56 – 59. Seal 61 and a companion seal 60, in a compartment 85' of chamber 85 formed by a shell 9, bear upon a polished reinforced wall portion 11 of rotating tube 23 on opposite sides of a ball bearing 53. The two shells 10, 9 have annular flanges 50, 51 interconnected by means of screws 67. Fixed to shell 9 are two coaxial tubes 12 and 22 separated by an evacuated annular space 26. Flange 51 has an annular groove accommodating a gasket 65 which bears upon the confronting face of flange 50.

The ends of the first and second rotating tubes 24 and 23 remote from load 32 form a fluidtight mechanical joint, similar to that of third and fourth tubes 18 and 30 shown in FIG. 2, inside the stationary tube 22; this joint also comprises a corrugated sleeve 63 of stainless steel. Feed channel 80 continues beyond the corrugated sleeve 63, within an extension 22' of tube 22, to a stationary cooling plant not further illustrated which supplies the low-temperature working fluid. Tubes 22 and 22' are interconnected, in the same manner as tubes 29 and 29', by a housing 35, 36 containing a getter 72 which is in contact, through a grid 69, with the jacket space 26 to maintain a hard vacuum therein. A temperature gradient, similar to that described above, is provided between evacuated spaces 82 and 26 along tube 22 which for this purpose is separated from tube 23 by a narrow annular clearance 46 open toward feed duct 80; the width of clearance 46 is substantially the same as that of clearance 44 and 45, i.e., on the order of one-hundredth the diameter of duct 80. Thus, the environment of seals 60, 61 (like that of seals 56, 59) is maintained at near-ambient temperatures to prevent their deterioration by excessive cooling.

All the tubes shown in the drawing are preferably made of stainless steel.

The system according to the present invention can be used for feeding and discharging low-temperature fluids in a liquid or gaseous state. The fluids circulated may be under high pressures, e.g. of 10 atmospheres. If recirculation of the spent fluid is not required, discharge duct 81 and associated elements (FIGS. 1 and 2) may be omitted.

As shown in FIG. 3, the vacuum in space 82 is maintained by a further adsorber or getter 71 in a housing rigid with tube 24, this housing forming a grid 71' above the adsorber bed.

What is claimed is:

1. A system for supplying a low-temperature fluid from a stationary source to a rotating load, comprising:

a set of coaxially nested tubes including an inner first tube and a surrounding second tube, said first tube forming a feed channel for the delivery of said fluid to the load, said second tube forming an inner thermally insulating space around said first tube;

a stationary structure including a jacket surrounding said tubes and a thermally conductive wall forming a chamber around a portion of said second tube, said jacket adjoining said wall and forming an outer thermally insulating space around said second tube;

antifriction bearing in said chamber supporting said tubes for rotation with the load relative to said structure, said bearing means engaging said portion of said second tube;

elastomeric annular seal means in said chamber peripherally engaging said second tube and defining with said bearing means an annular compartment closed by said wall against the atmosphere; and stationary tube means in said outer space separated with narrow clearance from said second tube, said clearance communicating with said feed channel at a location remote from said chamber and further communicating with said chamber on a side of said seal means opposite said bearing means for holding a substantially stationary body of fluid establishing a temperature gradient from said compartment to said feed channel.

2. A system as defined in claim 1 wherein said outer space is evacuated, further comprising getter means in said outer space supported by said tube means.

3. A system defined in claim 1 wherein said clearance has a width on the order of one-hundredth the diameter of said first tube.

4. A system as defined in claim 3 wherein the length of said clearance from said chamber to said location substantially exceeds said inner diameter.

5. A system as defined in claim 1 wherein said set of tubes includes a third tube surrounding part of said second tube and defining therewith a discharge channel for returning spent fluid from said load, and a fourth tube forming another thermally insulating space around said third tube, said structure including an extension of said jacket spacedly surrounding said fourth tube and another thermally conductive wall adjoining said extension of said jacket and forming a second chamber around a portion of said second tube, further comprising second antifriction bearing means engaging said portion of said fourth tube in said second chamber, said discharge channel terminating at an outlet in said structure between said jacket and said extension thereof, part of said stationary tube means defining with said fourth tube a narrow second clearance open to said second chamber and communicating with said discharge channel at said outlet, and second elastomeric annular seal means in said second chamber peripherally engaging said fourth tube at a location spaced from said second bearing means, said second clearance communicating with said second chamber on a side of said second seal means remote from said second bearing means for holding a substantially stationary body of fluid establishing a temperature gradient from said second chamber to said outlet.

6. A system as defined in claim 5 wherein each of said clearances has width on the order of one-hundredth the diameter of said first tube.

7. A system as defined in claim 5 wherein each of said clearances has an effective length substantially exceeding said inner diameter.

8. A system as defined in claim 5 wherein said second and fourth tubes are provided with polished surface positions of increased thickness in said chambers engaged by the seal means thereof.

9. A system as defined in claim 5 wherein said first and second tubes and said third and fourth tubes are interconnected by respective expansion joints at their ends remote from said load and are fixedly interconnected at their ends proximal to said load.

10. A system as defined in claim 9 wherein said expansion joints comprise corrugated sleeves at the remote ends of said first and third tubes enveloped by and secured to said second and fourth tubes, respectively.

* * * * *